Sept. 27, 1932.  G. D. THOMAS  1,879,592

DISTANCE INDICATOR FOR VEHICLES

Filed Sept. 16, 1930

WITNESSES

INVENTOR
Guyer D. Thomas,
BY
ATTORNEY

Patented Sept. 27, 1932

1,879,592

UNITED STATES PATENT OFFICE

GUYER D. THOMAS, OF YAKIMA, WASHINGTON

DISTANCE-INDICATOR FOR VEHICLES

Application filed September 16, 1930. Serial No. 482,358.

My invention relates to improvements in distance-indicators for vehicles and it consists in the combinations, constructions and arrangements herein described and claimed.

The primary object of this invention is the provision of a device, the use of which will enable the driver of a vehicle to readily approximate with a fair degree of accuracy the distance between his vehicle and any vehicle approaching from the rear.

A further object of this invention is the provision of a gage to be used in conjunction with the distance-indicator, whereby a driver may note the reading of such gage when the indicator is adjusted for his particular driving position, and thenceforth may quickly reset said indicator by a reference to the original reading of the gage. It is to be noted, in respect to the gage that it will register the exact position of the mirror with regard to both its horizontal and its vertical axes.

Other objects and advantages will appear in the following specification, and the novel features of the invention will be particularly pointed out in the appended claims.

My invention is illustrated in the accompanying drawing forming part of this application, in which:

Figure 3 is a diagram illustrating the method used in marking the graduations on my device, which diagram will be hereinafter more fully referred to.

Figure 1:
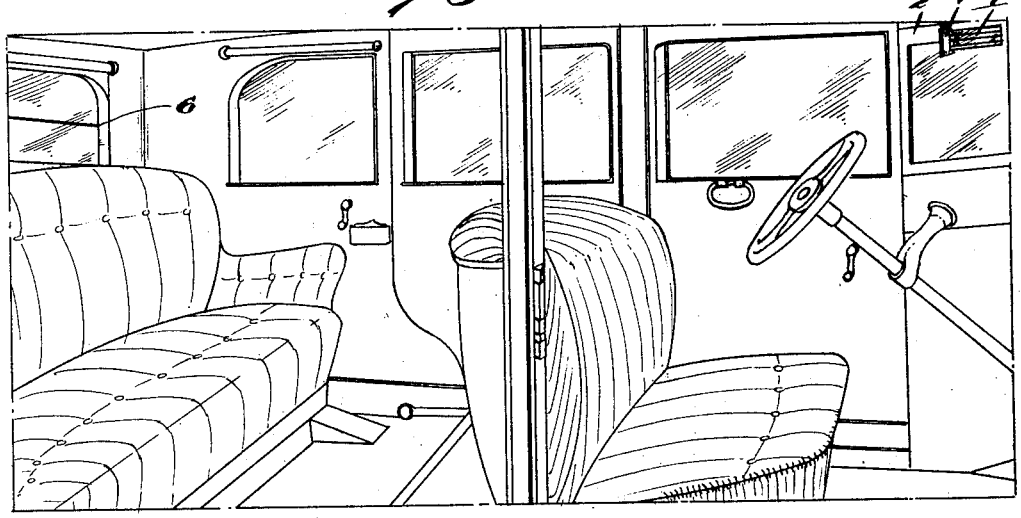
Figure 1 is a perspective view of the interior of a motor vehicle having my device mounted in operative position on the upper portion of the windshield frame.
Figure 2:
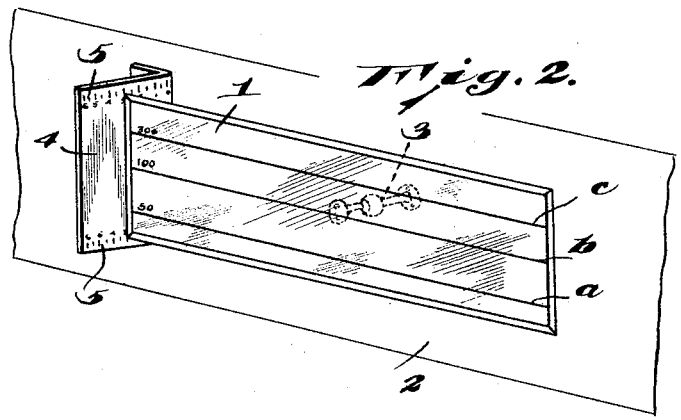
Figure 2 is a detailed perspective view of the device.

Referring more particularly to the drawing, I have shown therein a mirror 1 adjustably mounted on the frame of a windshield 2 by any suitable means such as a swivel 3.

Closely adjacent to one end of the mirror 1 and fixedly mounted on the frame 2 is a gage 4 having graduations 5 thereon.

On the face of the mirror is shown a series of horizontal lines indicated in the drawing as (a) (b) and (c).

The rear window of the vehicle bears a horizontal line 6.

The graduations or markings (a) (b) and (c) on the surface of the mirror may be located as follows: The driver assumes his normal driving position and a series of distances are measured off to the rear of the car, as for example 50, 100 and 300 feet. Objects are then placed at these measured positions and where they appear to the driver in the mirror horizontal lines are marked off, as indicated at (a) (b) and (c).

Figure 3:
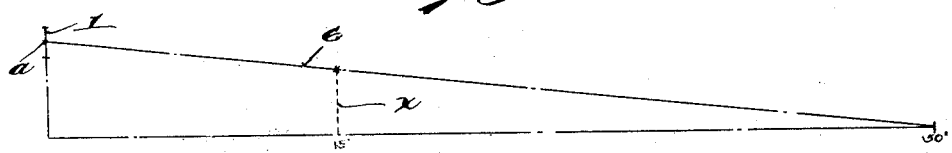

An alternative method of determining the positions of the horizontal lines (a) (b) and (c) is indicated in Figure 3, where the geometrical theorem "given similar triangles, the respective sides are proportionate", is taken advantage of in the following manner.

The height of the mirror from the street is measured, for example as 6 feet. From a point directly below the mirror a convenient distance, as, for example 15 feet is measured. A vertical measuring device of any suitable kind indicated at $(x)$ is set up at this point.

In order to secure a horizontal marking which will indicate 50 feet, the vertical measuring device is sighted through the mirror at a determined point. Where this incident ray passes through the rear window a line 6 may be placed for future reference, if desired. The point at which $(x)$ is sighted is determined through a simple algebraic equation, using the above mentioned theorem:

$$6:50 = x:35$$

from which we find that $(x)$ is 4.2 feet. For other distances the process would be the same.

In regard to the gage 4, whenever a driver has had the mirror adjusted to his particular driving position, he may note his particular marking on the gage 4 at 5 and thenceforth may quickly set the mirror by such marking. In this manner, any number of people may use the device with convenience.

I claim as new and desire to secure by Letters Patent:—

1. The combination with a vehicle having a support, of a rear-view mirror swivelled to said support and adjustable to different positions, lines carried by the mirror for indicating distances of objects to the rear of said vehicle, and a stationary gauge secured to said support adjacent to the mirror and having marks for indicating the adjusted positions of the mirror.

2. The combination with a vehicle having a support, of a rear-view mirror swivelled to said support and adjustable to different positions, said mirror consisting of a rectangular body portion and being provided with horizontal lines for indicating distances of objects to the rear of said vehicle, a stationary gauge secured to said support and having a portion projecting laterally past one end of the mirror and adjacent thereto, said laterally projecting portion of the gauge being provided with marks for indicating the adjusted positions of the mirror.

GUYER D. THOMAS.